United States Patent [19]

Schlumpf

[11] Patent Number: 5,303,942
[45] Date of Patent: Apr. 19, 1994

[54] SHIFTABLE PEDAL BEARING FOR A BICYCLE OR THE LIKE

[76] Inventor: Florian Schlumpf, Dorfstrasse 10, 7324 Vilters, Switzerland

[21] Appl. No.: 35,453

[22] Filed: Mar. 23, 1993

[30] Foreign Application Priority Data

Mar. 25, 1992 [CH] Switzerland .............. 00934/92

[51] Int. Cl.⁵ ............................................ B62M 11/14
[52] U.S. Cl. ................................ 280/238; 280/236; 280/259; 475/300
[58] Field of Search .......... 280/259, 236, 238; 475/300

[56] References Cited

U.S. PATENT DOCUMENTS

| | | | |
|---|---|---|---|
| 516,933 | 3/1894 | Jacoby | 280/236 |
| 544,776 | 8/1895 | Souder | 280/238 |
| 1,632,123 | 6/1927 | Else | 475/300 |
| 3,944,253 | 3/1976 | Ripley, III | 280/238 |
| 4,283,069 | 8/1911 | Citelli | 280/236 |

FOREIGN PATENT DOCUMENTS

3827819 3/1989 Fed. Rep. of Germany .
419998 12/1934 United Kingdom .

*Primary Examiner*—Mitchell J. Hill
*Attorney, Agent, or Firm*—Feiereisen & Kueffner

[57] ABSTRACT

A shiftable pedal bearing for a bicycle or the like includes a pedal bearing housing supporting a hollow crank axle carrying pedal cranks, and a gear casing with pertaining chainwheel and accommodating a disk which extends parallel to the chainwheel. Arranged in the crank axle is a switch shaft which is actuatable from outside by a shifter so that a coupler, which is operatively connected to the switch shaft, is selectively engageable with circumferential recesses in the chainwheel and a disk. Each recess of the chainwheel and each recess of the disk is of stepped configuration to define a first recess section and a second recess section, with the coupler in a first stage engaging the first recess section with play and in a second stage snugly fitting in the second recess section with no play.

16 Claims, 6 Drawing Sheets

SHIFTABLE PEDAL BEARING FOR A BICYCLE OR THE LIKE

BACKGROUND OF THE INVENTION

The present invention refers to a shiftable pedal bearing for a bicycle or the like, and in particular to a pedal bearing of the type having a bearing housing, a gearing with pertaining chainwheel and a disk which extends parallel to the chainwheel, and with a pedal crank carrying crank axle which axially traverses the pedal bearing housing and accommodates a switch shaft which is connected to a coupler and actuatable from outside by a shifter so that the coupler is engageable with circumferential and offset recesses of the chainwheel or with circumferential and offset recesses of the disk.

German publication no. DE-A 38 27 819 discloses a shiftable pedal bearing of this type for a bicycle or the like, in which the coupler, through axial displacement of the switch shaft, is shifted between two switching positions for engagement with the chainwheel of the pedal bearing or with a planet cage in order to effect a speed variation.

This known pedal bearing requires that those parts which rotate relative to each other during riding are provided with relatively large recesses to ensure engagement by the coupler without causing a blockage or jamming of the gearing during the shifting process. However, the adverse effect of employing such relatively large recesses is the creation of a disturbing play which causes the rider to have an uncomfortable feeling because of the perception that the operative connection between the pedal cranks and the crank axle is not maintained.

SUMMARY OF THE INVENTION

It is thus an object of the present invention to provide an improved shiftable pedal bearing of the above type, obviating the aforestated drawbacks.

In particular, it is an object of the present invention to provide an improved shiftable pedal bearing by which the crank axle is engageable in rotational direction with the chainwheel or with the disk with no play, and yet a jam-free shifting operation is ensured.

These objects, and others which will become apparent hereinafter are attained in accordance with the present invention by providing the chainwheel and the disk with circumferential recesses, with each recess being step-shaped so as to define a first recess section and a second recess section which are dimensioned in such a manner that the coupler engages in a first phase the first recess section with play while closely fitting in a second phase with no play within the second recess section.

Preferably, the disk is part of a planetary gear train and represents a sun wheel with external teeth in mesh with a planet wheel which is also in engagement with internal teeth of the gear casing of the gearing.

According to another feature of the present invention, the pedal bearing is provided with an anti-torque assembly which includes a lever arm bearing tangentially upon the gear casing and having at least one arched segment which snugly fits about a fork tube which is part of the bicycle frame and is fixedly mounted to the pedal bearing housing. In this manner, a torque acting in opposition to the rotation of the pedal cranks is eliminated.

The chainwheel extends at a distance from the gear casing so that a gap is formed therebetween. In order to protect the interior space of the gear casing from penetration by pollutants, it is proposed in accordance with a further feature of the present invention to close the gap by a shield. Preferably, the shield is of L-shaped cross section, with a horizontal flange which is attached to the gear casing, and with a radially inwardly directed annular bridge which is under tension so as to be urged against a seal situated in a bore of the chainwheel. In this manner, the interior space of the gear casing is shielded from the outside against penetration of spray water, dust or other pollutants, and moreover an escape of gear lubricant is prevented.

According to yet another feature of the present invention, each pedal crank is provided with a bore for receiving a locking member by which the pedal crank is securely fixed to the crank axle, and a shifter by which the coupler is shifted via the switch shaft into the switching positions with either the chainwheel or the disk. The shifter is provided with a hub portion which is sealingly guided in the crank axle and operatively connected to the switch shaft. Thus, the switch shaft can be actuated from outside by means of the shifter in order to effect a displacement of the coupler into the respective switching positions.

Suitably, the shifter is configured in such a manner that a penetration of dirt or other pollutants into the interior of the pedal crank is prevented because the bore of the pedal crank is covered in each switching position by the shifter.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
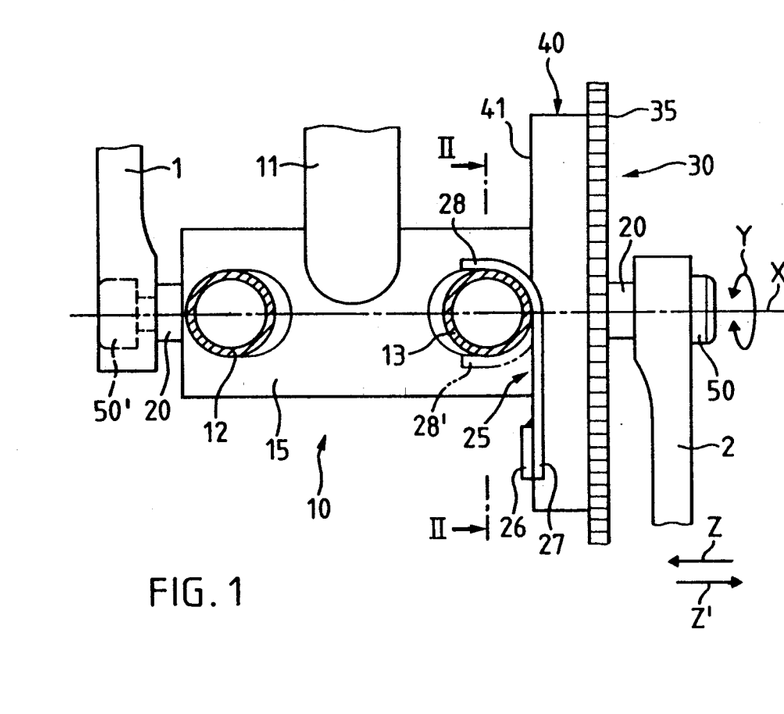
FIG. 1 is a simplified schematic view of a pedal bearing for a bicycle or the like with integrated variable gearing and an anti-torque assembly.

Referring now to the drawing and in particular to FIG. 1, there is shown a schematic illustration of a shiftable pedal bearing for a bicycle or the like, generally designated by reference numeral 10 and viewed from the rear fork of the bicycle frame. The pedal bearing 10 includes a pedal bearing housing 15, a hollow crank axle 20 which is supported in and axially traverses the pedal bearing housing 15 and carries pedal cranks 1, 2 at its opposing axial ends.

Mounted at the pedal bearing 10 is a gearing which is generally designated by reference numeral 30 and is operatively connected to the crank axle 20. The gearing 30 has a gear casing 40 which is connected to a chainwheel 35 driven by a chain from the pedal crank 1, 2. The gearing 30 is actuated by the pedal cranks 1, 2 which are rotatably supported by the crank axle 20 about an axis X in direction of arrow Y.

A shift of the gearing 30 is initiated by shifters 50, 50' which are only schematically illustrated in FIG. 1. The shifters 50, 50' are shiftable in a direction as indicated by arrows Z and Z', and their structure and mode of operation will be described in more detail furtherbelow.

The pedal bearing housing 15 is attached to the bicycle frame which, for ease of illustration, is only illustrated fragmentarily in FIG. 1 by the seat tube 11, and by two fork tubes 12 and 13 which are part of the rear fork. The seat tube 11 as well as the fork tubes 12 and 13 are attached to the pedal bearing housing 15 by any suitable means, e.g. through welding.

The gear casing 40 has a rear wall 41 which faces the fork tube 13 and supports an anti-torque assembly, generally designated by reference numeral 25 and acting upon the fork tube 13, as will be described now in more detail with reference to FIG. 2.

Figure 2:
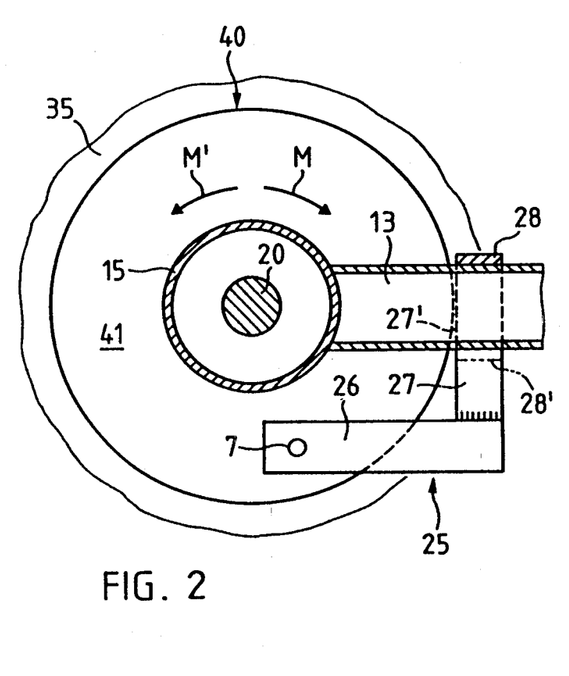
FIG. 2 is a partially sectional view of the pedal bearing, taken along the line II-II in FIG. 1 and illustrating in detail a side view of a first embodiment of the anti-torque assembly in cooperation with the gearing.

FIG. 2 is a partially sectional view of the anti-torque assembly 25, taken along the line II—II in FIG. 1. The anti-torque assembly 25 includes a fishplate 26, a lever arm 27 and at least one arched segment 28 which is connected at one axial end to the lever arm 27. As indicated in broken lines, the other axial end of the lever arm 27 may also be provided with an arched segment 28'. The fishplate 26 extends parallel to the fork tube 13 and is attached at one axial end to the rear wall 41 of the gear casing 40, e.g. by means of a screw fastener 7. The lever arm 27 is welded to the other axial end of the fishplate 26 at a right angle thereto and extends along the rear wall 41 in such a manner that the lever arm 27 tangentially bears and is pressed with its contact edge 27' against the facing side of the gear casing 40.

As best seen in FIG. 1, the arched segment 28 of the lever arm 27 is configured in correspondence to the outer contour of the fork tube 13 so as to snugly envelope the fork tube 13. When providing the lever arm 27 with a further arched segment 28', one half of the fork tube 13 thus becomes essentially enveloped in form-fitting manner by both arched segments 28, 28'. Suitably, the arched segments 28, 28' are an integral part of the lever arm 27.

By means of the anti-torque assembly 25, the creation of a torque is eliminated which acts primarily upon the rear wall 41 of the gear casing 40 in opposition to the rotation of the pedal cranks 1, 2, as indicated by arrow M. The provision of the additional arched segment 28' prevents a torque in direction of arrow M', acting at the rear wall 41 of the gear casing 40 in opposite direction and caused in particular during operation of the backpedalling brake (not shown).

Figure 3:
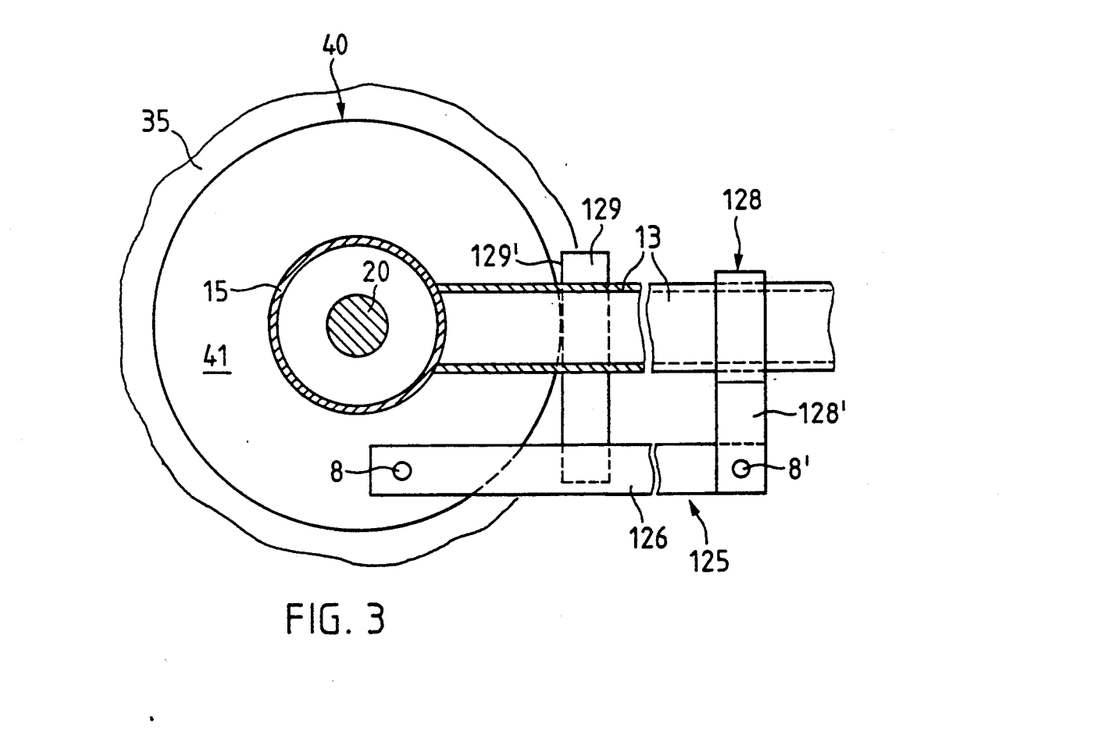
FIG. 3 is a partially sectional view of the pedal bearing, taken along the line II—II in FIG. 1 and illustrating in detail a side view of a second embodiment of the anti-torque assembly.

In the embodiment of the anti-torque assembly 25 as shown in FIG. 2, the lever arm 27 is pressed against the gear casing 40 and includes at least one arched segment 28 to hook on to the fork tube 13. FIG. 3 shows a slightly different embodiment of an anti-torque assembly 125 by which the hook-on to the tube 13 is assumed by a separate element.

The anti-torque assembly 125 according to FIG. 3 includes a fishplate 126 which is mounted at one axial end to the rear wall 41 by means of a screw fastener 8 and extends approximately parallel to the fork tube 13. A lever arm 129 is suitably attached to the fishplate 126 so that a contact edge 129' of the lever arm 129 tangentially bears upon and is pressed against the gear casing 40. Arranged at a distance to the lever arm 129 and mounted by a screw fastener 8' to the other axial end of the fishplate 126 is a holding element 128 which is provided with an arched segment to closely envelope the upper curved section of the fork tube 13, and a downwardly directed bridge 128' which is mounted to the respective axial end of the fishplate 126 by the screw fastener 8'.

The mode of operation of the anti-torque assembly 125 corresponds essentially to the operation of the anti-torque assembly 25.

Figure 4:
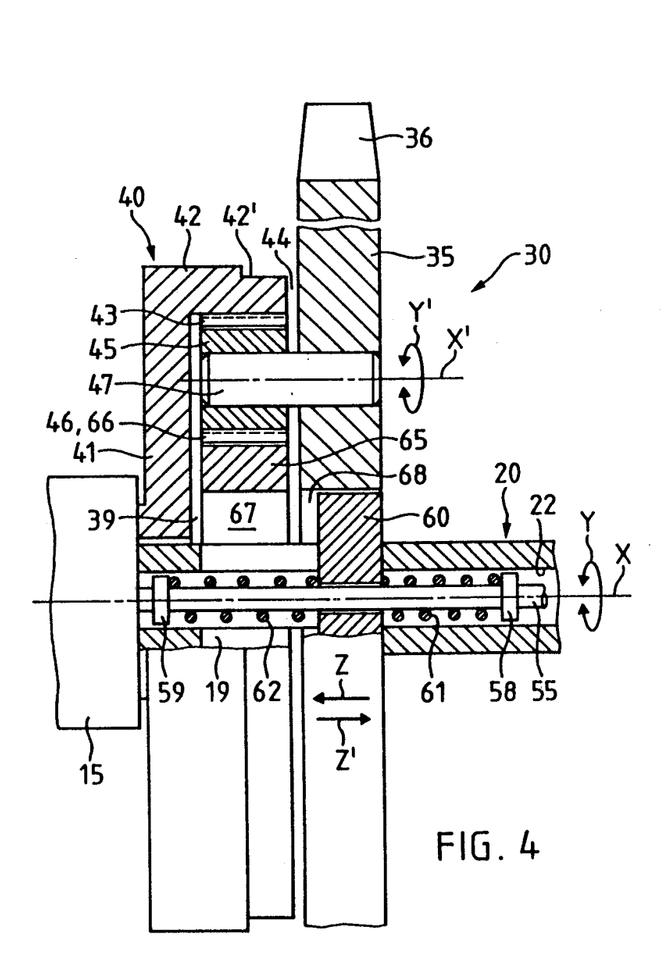
FIG. 4 is an enlarged partially sectional view of a first embodiment of the gearing with integrated switching mechanism for the pedal bearing.

Turning now to FIG. 4, there is shown an enlarged partially sectional view of a first embodiment of the gearing 30 with integrated switching mechanism for the pedal bearing 10. A gap 44 separates the gear casing 40 from the chainwheel 35 with its teeth 36. The gear casing 40 includes the rear wall 41 and an annulus 42 with internal teeth 43, with the rear wall 41 and the annulus 42 defining an interior space 39.

The chainwheel 35 is provided at a suitable location with a bore which receives a bearing pin 47 with one axial end terminating flush with the outer surface of the chainwheel 35 and another axial end projecting beyond the opposing side of the chainwheel 35 to rotatably support a planet wheel 45 about the axis X' in direction of arrow Y'. The planet wheel 45 is in engagement with its external teeth 46 with the internal teeth 43 of the annulus 42 of the gear casing 40 and additionally with external teeth 66 of a disk 65. The disk 65 is supported on the crank axle 20 and represents the sun wheel of a respective planetary gear train which is defined by the annulus 42, the sun wheel 65 and the planet wheel 45.

Persons skilled in the art will understand that the planetary gear train may certainly incorporate more than one planet wheel 45. For example, the chainwheel 35 may support two diametrically opposing planet wheels 45 which are in engagement with the sun wheel 65 and the internal teeth 43 of the annulus 42. Certainly, more than two planet wheels 45 may also be provided which are e.g. evenly distributed about the circumference of the chainwheel 35.

As can be further seen from FIG. 4, the crank axle 20 includes an axial bore 22 in which a switch shaft 55, acting as tappet, is accommodated and supports a coupler 60. At each axial end of the switch shaft 55 is an abutment 58, 59 which is adjustable in axial direction along the switch shaft 55. Extending between each abutment 58, 59 and the coupler 60 is a compression spring 61, 62. The initial tension of the springs 61, 62 is adjustable through suitably positioning the abutments 58, 59 relative to the coupler 60.

In the switching position of the gearing 30, as shown in FIG. 4, the coupler 60 is received in a recess 68 of the chainwheel 35 and in an axial slot 19 of the crank axle 20. As indicated by arrow Z, the coupler 60 is shiftable through actuation of the switch shaft 55 in order to engage a recess 67 in the disk 65. In this (not shown) position of the coupler 60, the crank axle 20 is in engagement with the sun wheel 65 and the planet wheel 45 via the coupler 60. Thus, by shifting the coupler 60 in either of the directions as indicated by arrows Z and Z', the coupler 60 is selectively engageable with the sun wheel 65 and with the chainwheel 35. The actuation of the switch shaft 55 and thus the shift of the coupler 60 is initiated by the shifters 50, 50' (FIG. 1) which are mounted on the pedal cranks 1, 2 and cooperate with the switch shaft 55, as will be described in detail furtherbelow.

Figure 5:
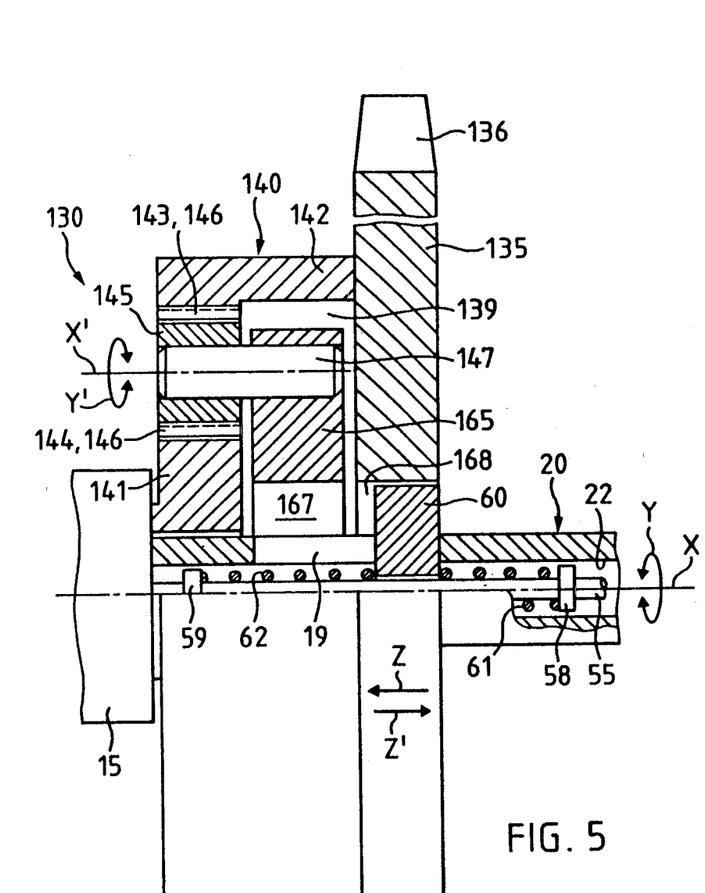
FIG. 5 is an enlarged partially sectional view of a second embodiment of the gearing with integrated switching mechanism for the pedal bearing.
Figure 6A:
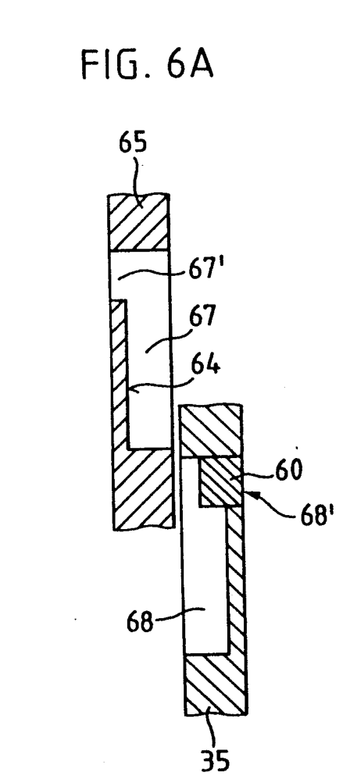
FIG. 6 is a schematic illustration of the switching mode, with functionally relevant parts (chainwheel and disk) of the switching mechanism for the pedal bearing being illustrated by way of a developed view.
Figure 6B:
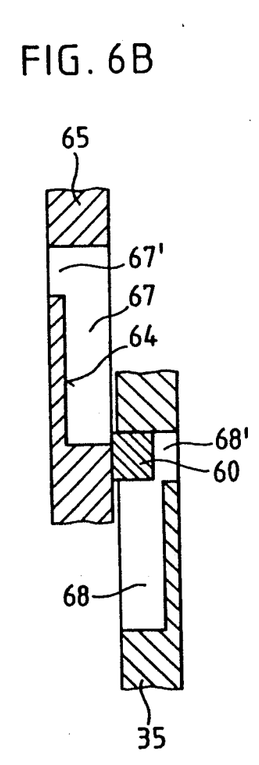
Figure 6C:
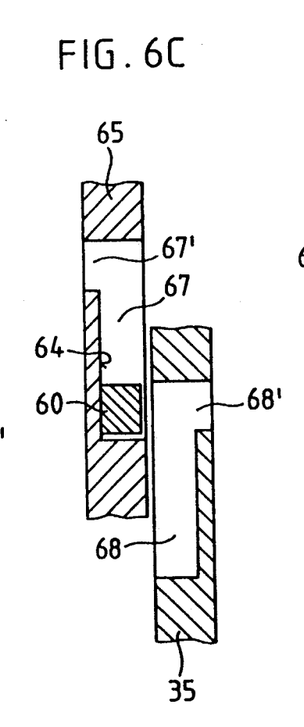
Figure 6D:
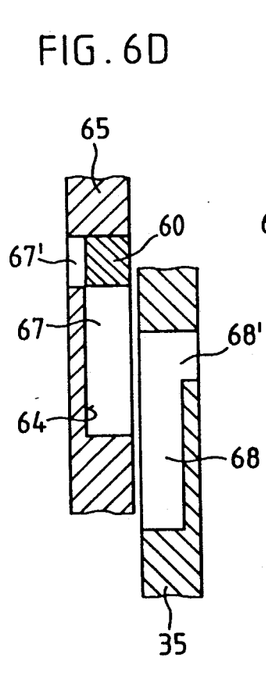
Figure 6E:
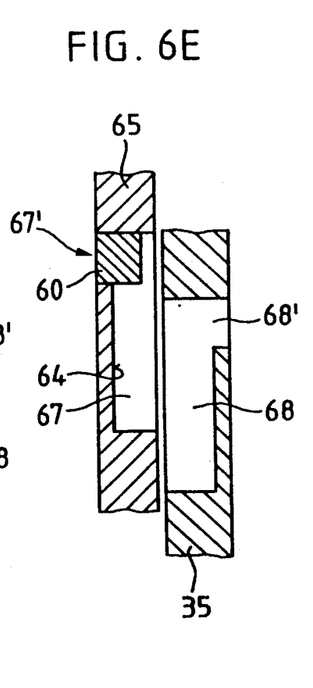

FIG. 5 shows an enlarged partially sectional view of a second embodiment of a gearing with integrated switching mechanism for the pedal bearing 10, with the gearing generally designated by reference numeral 130. In contrast to the gearing 30 of FIG. 4, the gearing 130 includes a gear casing 140 with an annulus 142 which is laterally mounted onto the chainwheel 135 through suitable means, e.g. a bolted connection. The internal teeth 143 of the annulus 142 are in mesh with external teeth 144 of a rear wall 141 of the gear casing 140, with the rear wall 141 being suitably connected to the pedal bearing housing 15. The annulus 142 and the rear wall 141 are parts of a respective planetary gear train, with rear wall 141 representing the sun wheel. The planetary gear train further includes a planet wheel 145 with external teeth 146 which engage the internal teeth 143 of the annulus 142 and the external teeth 144 of the sun wheel 141.

Persons skilled in the art will understand that two or more diametrically opposing planet wheels 145 may also be provided, with each planet wheel 145 including external teeth 146 in mesh with the internal teeth 143 of the annulus 142 and with the external teeth 144 of the sun wheel 141.

The gear casing 140, comprised of the rear wall 141, the annulus 142 and the planet wheel 145 defines an interior space 139 in which a disk 165, designed as planet cage, is fitted and suitably mounted on the crank axle 20. The disk 165 is provided at an upper location with an axial bore for receiving a bearing pin 147 which rotatably supports the planet wheel (or planet wheels) 145 about a longitudinal axis X' in direction of arrow Y'. The external teeth 146 of the planet wheel 145 are in mesh with the internal teeth 143 of the annulus 142 as well as with the external teeth 144 of the sun wheel 141.

In the switching position as shown in FIG. 5, the coupler 60 is located in a recess 168 of the chainwheel 135 and is shiftable in direction of arrow Z to occupy the other switching position (not shown) in which the coupler 60 is received in a recess 167 of the disk (planet cage) 165 so that the crank axle 20 is now in engagement with the disk 165 via the coupler 60. The shift of the coupler 60 in either of the directions as indicated by arrows Z, Z' is carried out with one of the springs 61, 62 supporting the displacement and the other one exerting a counterforce.

The switching mode of the gearing 30 is controlled through a shift of the switch shaft 55 in direction of arrows Z or Z' so as to selectively engage the crank axle 20 via the coupler 60 with either the sun wheel 65 or with the chainwheel 35, as will now be described with reference to FIG. 6, which shows, by way of a developed view, the sun wheel (or disk) 65 and the chainwheel 35 as the functionally relevant parts of the switching mechanism for the pedal bearing, and the coupler 60 in cross sectional view.

As indicated in FIG. 6, the sun wheel 65 is provided with circumferential recesses, with each recess being step-shaped to define a first recess section 67 and a second recess section or opening 67' which extends through the disk 65. Likewise, the chainwheel 35 is provided with circumferential recesses, with each recess being step-shaped to define a first recess section 68 and a second recess section or opening 68' which extends through the chainwheel 35.

In the switching position A, the coupler 60 is received in form-fitting manner with no play in the opening 68' of the chainwheel 35 so that the crank axle 20 is operatively connected with the chainwheel 35 in a manner as illustrated in FIG. 4.

In the switching position B, the coupler 60 is shifted by the switch shaft 55 into the first recess section 68 of the chainwheel 35 and pressed against the sun wheel 65 by the restoring force exerted by the compression spring 61.

In the switching positions C and D, the first recess section 67 of the sun wheel 65 and the first recess section 68 of the chainwheel 35 overlap each other so that the coupler 60 is pushed into the recess section 67 and slides along the wall surface 64 of the disk 65 until engaging the opening 67' of the sun wheel 65.

In the switching position E, the coupler 60 is snugly fitted in the opening 67' of the sun wheel 65 so that the sun wheel 65 is operatively connected with the crank axle 20.

Thus, the first recess sections 67, 68 and the openings (or second recess sections) 67', 68' are dimensioned in such a manner that in the switching positions A and E, the coupler 60 is received in the respective openings 68' and 67' with no play so as to be rigidly connected with the chainwheel 35 and with the sun wheel 65. In the intermediate switching positions B, C and D, however, the coupler 60 is received in the respective first recess sections 68, 67 with play.

The mode of operation of the gearing 130 in direction of arrows Z or Z' and the selective engagement of the coupler 60 with the chainwheel 135 and the disk 165 are accomplished in the same manner as described in connection with the gearing 30 and illustrated in FIG. 6. Thus, the chainwheel 135 and the disk 165 are each provided with circumferential recesses, with each recess being step-shaped to define a first recess section 167; 168 and a second recess section in form of an opening.

Figures 7, 8, 9:
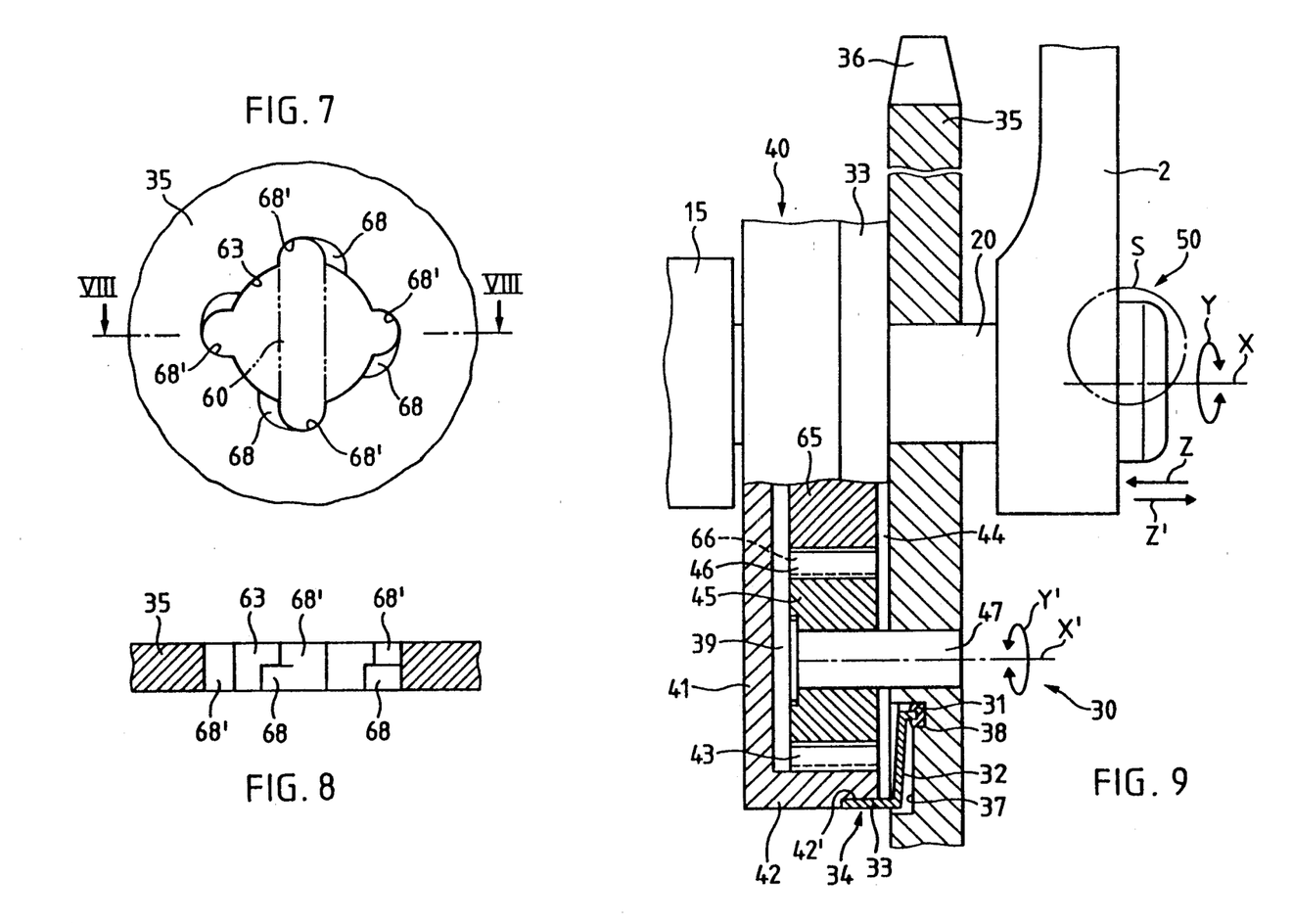
FIG. 7 is an illustration of a disk-shaped chainwheel for use in the switching mechanism.
FIG. 8 is a sectional view of the chainwheel, taken along the line VIII—VIII in FIG. 7.
FIG. 9 is a partially sectional view of the pedal bearing of FIG. 1, illustrating in detail a shield for the gearing.

Turning now to FIGS. 7 and 8, there are shown a plan view and a sectional view, taken along the line VIII—VIII in FIG. 7 of the disk-shaped chainwheel 35, and it can be seen that the chainwheel 35 is provided with a cylindrical bore 63 for receiving the crank axle 20 and includes evenly spaced stepped circumferential recesses, with each recess having a first recess section 68 and an opening 68'. As further shown in FIG. 7, the coupler 60 radially traverses the crank axle 20 and has opposing axial ends of arched configuration in correspondence to the facing openings 68' so as to be received with no play in two diametrically opposing openings 68' when occupying the switching positions A and E (see FIG. 6).

Persons skilled in the art will understand that the sun wheel 65 of gearing 30, as well as the chainwheel 135 and the disk 165 of gearing 130 are designed in the same manner as the chainwheel 35 and thus includes like evenly spaced stepped circumferential recesses.

Although not shown in detail in the drawing, the openings 67', 68'; 167', 168' as respectively provided in the chainwheel 35; 135 and disk 65; 165 may be confined by the rear wall of the chainwheel or disk and thus need not extend through the rear wall as shown in FIG. 6.

FIG. 9 is a partially sectional enlarged view of the pedal bearing 30 and depicts in particular the arrangement of a shield 34 for closing off the gap 44 between the gear casing 40 and the chainwheel 35 and thus the interior space 39 of the gear casing 40. The shield 34 is of L-shaped configuration and includes a flange 33 which is received and suitably attached in a recess 42' at the outer perimeter of the annulus 42. The flange 33 is connected in one piece with an inwardly directed annular bridge 32 which is received in a corresponding bore 37 of the chainwheel 35. The inner axial end of the bore 37 is in communication with a continuous groove 38 which accommodates an annular seal 31, e.g. an O-ring seal. The bridge 32 is angled relative to the flange 33 to impart the bridge 32 with a tension so as to be pressed against the seal 31 in the groove 38.

By way of the shield 34 which is arranged between the gear casing 40 and the chainwheel 35, a penetration of spray water, dust and dirt into the interior space 39 of the gear casing and an escape of gear lubricant are prevented in a simple constructive manner.

Figure 10:
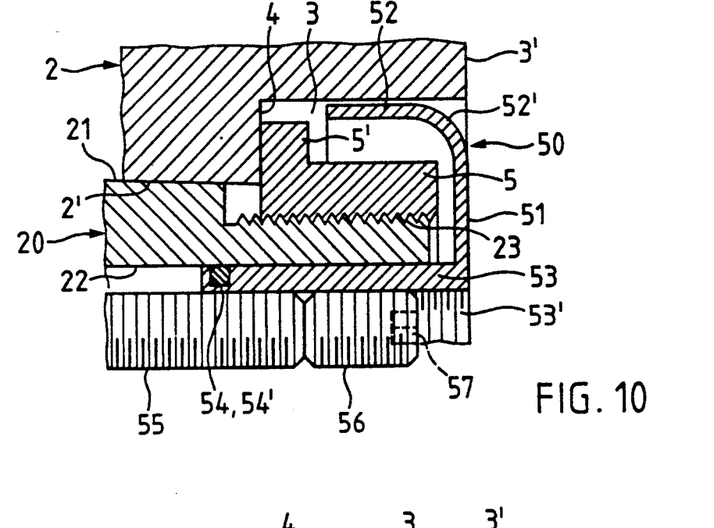
FIG. 10 is an enlarged partially sectional view of a first embodiment of a fastening mechanism for securing a pedal crank to the crank axle, and a shifter in a first position for actuation of the gearing.
Figure 11:
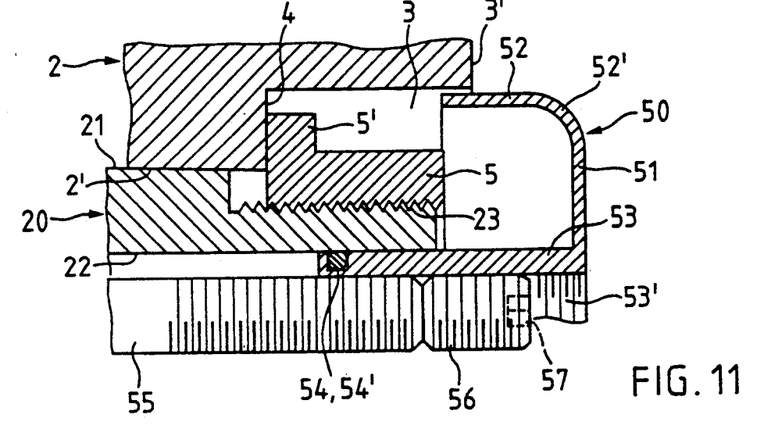
FIG. 11 is a partially sectional view of the fastening mechanism according to FIG. 10, with the shifter in a second position.

FIGS. 10 and 11 are detailed illustrations of circle S designated in FIG. 9 to show the actuation of the switch shaft 55, and in particular illustrate the shifter 50, by way of enlarged sectional views, with FIG. 10 depicting a first position of the shifter 50 and FIG. 11 depicting a second position of the shifter 50.

The pedal crank 2 is provided with a bore 2' of a conical configuration which bears on a complementary conical axle portion 21 of crank axle 20. The axial end of the crank axle 20 is provided with a thread 23 which is in engagement with a locking member 5. The locking member 5 is provided with an annular flange 5' which abuts a bearing surface 4 of the pedal crank 2. In this manner, the pedal crank 2 is rigidly connected with the crank axle 20.

The shifter 50 is of generally cap-shaped configuration and includes a hub 53 which extends in the axial bore 22 and is sandwiched between the crank axle 20 and the switch shaft 55. At its crank axle near end, the hub 53 has an annular groove 54 for receiving a seal 54'. At its other axial end, the hub 53 is provided with an internal thread 53' for engagement in a complementary thread of the switch shaft 55 to provide a rigid connection therebetween, and is connected in one piece to a disk-shaped push element 51 which in turn is connected in one piece to a ring member 52 preferably via a circular arched section 52'. The ring member 52 is received in a bore 3 of the pedal crank 2.

The shifter 50 is thus operatively connected via the hub 53 with the switch shaft 55 and may be secured by a set screw 56 with hexagon socket 57 which is bolted into the hub 53 of the shifter 50.

During assembly, each pedal cranks 1, 2 (only pedal crank 2 is shown in FIG. 10) is mounted to the crank axle 20 by means of the locking member 5. The shifter 50 is screwed into the pedal crank 2 until, in actuated (pressed) position as shown in FIG. 10, the outside surface of the ring member 52 extends flush with the outside surface 3' of the pedal crank 2. A shifter 50 (and shifter 50' for the pedal crank 1) of this type can thus be adjusted in axial direction and suited to varying widths of commercially available pedal cranks.

The configuration of the shifter 50 ensures also that in the other switching position, as shown in FIG. 11, in which the shifter 50 extends beyond the outside surface 3' of the pedal crank 2, the interior of the pedal crank 2 is protected against penetration of dirt or other pollutants as a section of the ring member 52 is still received in the bore 3.

Figure 12:
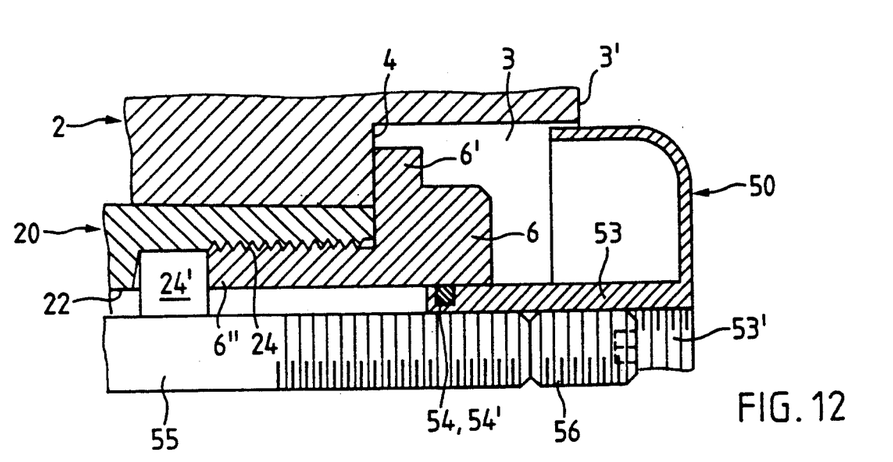
FIG. 12 is an enlarged partially sectional view of a second embodiment of a fastening mechanism for securing a pedal crank to the crank axle.

FIG. 12 illustrates another embodiment for attaching the pedal cranks 1, 2 to the crank axle 20. In accordance with FIG. 12, the crank axle 20, which includes the axial bore 22 for receiving the switch shaft 55, is provided at one axial end with a bore 24' in form of a blind hole and with an internal thread 24. Engaging the internal thread 24 of the crank axle 20 is a projection of a locking member 6 which is further provided with a flanged portion 6' abutting upon the bearing surface 4 of the pedal crank 2. Thus, the pedal crank 2 is rigidly connected with the crank axle 20.

Traversing the locking member 6 is an axial bore 6" in which the hub 53 of the shifter 50 is adjustably arranged and sealed in axial direction. Except for the securement of the pedal cranks 1, 2 to the crank axle 20, all other parts correspond to the embodiment as shown in FIGS. 10 and 11.

While the invention has been illustrated and described as embodied in a shiftable pedal bearing for a bicycle or the like, it is not intended to be limited to the details shown since various modifications and structural changes may be made without departing in any way from the spirit of the present invention.

What is claimed as new and desired to be protected by Letters Patent is set forth in the appended claims:

1. A shiftable pedal bearing for a bicycle or the like, comprising:
   a pedal bearing housing;
   a crank axle axially traversing said pedal bearing housing and carrying a pedal crank at opposite axial ends;
   a gearing having a gear casing with a chainwheel and a disk extending parallel to said chainwheel, each of said chainwheel and said disk being provided with circumferential recesses, with each recess being step-shaped to define a first recess section and a second recess section;
   a coupler shiftable between two switching positions for selectively connecting said crank axle with said chainwheel and with said disk by respectively engaging said recesses of said chainwheel and said recesses of said disk in such a manner that said coupler in a first phase engages said first recess section with play and in a second phase snugly fits in said second recess section with no play; and
   actuating means secured to said crank axle and operatively connected to said coupler for shifting said coupler between said switching positions.

2. The pedal bearing defined in claim 1 wherein said actuating means includes a switch shaft arranged in said crank axle, and a shifter secured to said switch shaft and actuated from outside.

3. The pedal bearing defined in claim 1 wherein said chainwheel and said disk are each provided with evenly spaced circumferential recesses.

4. The pedal bearing defined in claim 1 wherein said disk represents a sun wheel with external teeth, said gearing further including at least one planet wheel supported by said chainwheel and meshing with said external teeth of said sun wheel and with internal teeth of said gear casing.

5. The pedal bearing defined in claim 1 wherein said gear casing has a rear wall which represents a sun wheel, said gearing further including an annulus having internal teeth and being supported by said chainwheel and at least one planet wheel which is supported by said disk and engages said sun wheel and said internal teeth of said annulus.

6. The pedal bearing defined in claim 5 wherein said gearing includes a plurality of planet wheels which are evenly spaced from each other at said disk.

7. The pedal bearing defined in claim 1 wherein said second recess section of each recess of said chainwheel is an opening extending through said chainwheel.

8. The pedal bearing defined in claim 1 wherein said second recess section of each recess of said disk is an opening extending through said disk.

9. The pedal bearing defined in claim 1 wherein said second recess section of each recess of said chainwheel is confined by a rear wall of said chainwheel.

10. The pedal bearing defined in claim 1 wherein said second recess section of each recess of said disk is confined by a rear wall of said disk.

11. The pedal bearing defined in claim 1, and further comprising a tube forming part of a frame and being connected to said pedal bearing housing, and an anti-torque assembly disposed at a rear wall of said gear casing, said anti-torque assembly including a lever arm bearing tangentially upon said gear casing and having at least an arched segment hooking in form-fitting manner onto said tube.

12. The pedal bearing defined in claim 1, and further comprising covering means attached to said gear casing for shielding an interior space of said gear casing, said covering means including a radially inwardly directed annular shield and a seal received in a bore of said chainwheel, said shield being under tension so as to be pressed upon said seal.

13. The pedal bearing defined in claim 2, and further comprising a locking member for mounting said pedal crank to said crank axle, said pedal crank having a bore which receives said locking member and said shifter, with said shifter having a hub sealingly guided in said crank axle and operatively connected to said switch shaft.

14. The pedal bearing defined in claim 13 wherein said shifter is of cap-shaped configuration and includes a ring member received in said bore of said pedal crank in each of said switching positions.

15. The pedal bearing defined in claim 2, and further comprising a locking member threadably engageable to said crank axle for mounting said pedal crank to said crank axle, said pedal crank having a bore which receives said locking member and said shifter, with said shifter having a hub sealingly guided in said locking member and operatively connected to said switch shaft.

16. A shiftable pedal bearing for a bicycle or the like, comprising:

a crank axle carrying a pedal crank at opposite axial ends;

a gearing including a chainwheel and a disk which extends parallel to said chainwheel, each of said chainwheel and said disk being provided with circumferential recesses, with each recess being step-shaped to define a first recess section and a second recess section;

coupling means shiftable between switching positions for selectively connecting said crank axle with said chainwheel and with said disk, said coupling means being engageable in said recesses of said chainwheel and said disk in such a manner that in a first phase said coupling means engages said first recess section with play and in a second phase said coupling means engages said second recess section with no play; and actuating means secured to said crank axle for shifting said coupling means between switching positions.

* * * * *